United States Patent
Coutinho et al.

(10) Patent No.: US 12,547,836 B2
(45) Date of Patent: Feb. 10, 2026

(54) KNOWLEDGE FACT RETRIEVAL THROUGH NATURAL LANGUAGE PROCESSING

(71) Applicant: ADP, Inc., Roseland, NJ (US)

(72) Inventors: Roberto Coutinho, Porto Alegre (BR); Roberto Silveira, Porto Alegre (BR); Guilherme Gomes, Porto Alegre (BR); Carlos Nascimento, Porto Alegre (BR); Felipe Lisboa Suslik, Santana Do Livramento (BR)

(73) Assignee: ADP, Inc., Roseland, NJ (US)

( * ) Notice: Subject to any disclaimer, the term of this patent is extended or adjusted under 35 U.S.C. 154(b) by 185 days.

(21) Appl. No.: 18/066,128

(22) Filed: Dec. 14, 2022

(65) Prior Publication Data

US 2024/0202449 A1 Jun. 20, 2024

(51) Int. Cl.
*G06F 40/30* (2020.01)
*G06F 40/295* (2020.01)
*G06V 30/19* (2022.01)

(52) U.S. Cl.
CPC ............ *G06F 40/30* (2020.01); *G06F 40/295* (2020.01); *G06V 30/19093* (2022.01)

(58) Field of Classification Search
CPC ....................................................... G06F 40/30
See application file for complete search history.

(56) References Cited

U.S. PATENT DOCUMENTS

| | | | | |
|---|---|---|---|---|
| 10,432,639 | B1* | 10/2019 | Bebee | G06F 16/90335 |
| 12,072,918 | B1* | 8/2024 | Newman | G06N 3/045 |
| 2022/0014542 | A1* | 1/2022 | Janakiraman | H04L 63/1433 |
| 2023/0122031 | A1* | 4/2023 | Conley | G06F 16/951 |
| | | | | 707/728 |
| 2023/0376687 | A1* | 11/2023 | Morariu | G06F 40/279 |
| 2023/0409577 | A1* | 12/2023 | Andre | G06F 40/40 |

OTHER PUBLICATIONS

Lexology; "Practice Analysis and Case Study—Conflict of Interest in Employment Relations"; AnJie Law Firm; https://www.lexology.com/library/detail.aspx?g=007533d0-5d5b-4195-8be3-b068cedf98ec; 6 pages.
Faiss; "Welcome to Faiss Documentation"; Facebook AI Similarity Search; https://faiss.ai/; 3 pages.
ANN Benchmarks; http://ann-benchmarks.com/index.html; 27 pages.
Lexology; "Practice Analysis and Case Study—Conflict of Interest in Employment Relations"; AnJie Law Firm; https://www.lexology.com/library/detail.aspx?g=007533d0-5d5b-4195-8be3-b068cedf98ec; 6 pages, Oct. 11, 2019.

(Continued)

*Primary Examiner* — Bryan S Blankenagel
(74) *Attorney, Agent, or Firm* — Foley & Lardner LLP

(57) ABSTRACT

A method for fact retrieval includes receiving an input from a user, said input including a string of text that represents a user intent. The method includes performing natural language processing on the input to generate an embedding that corresponds to a semantic representation of the string of text, and based on the generated embedding, identifying an action that is associated with the user intent. The method includes executing the identified action, such that the executed action returns a result associated with the user intent, and providing the result to the user.

22 Claims, 16 Drawing Sheets

(56) References Cited

OTHER PUBLICATIONS

Technology Org Science & Technology News; "'Knowledge Vault' is a massive database of facts"; Posted Aug. 25, 2014; https://www.technology.org/2014/08/25/knowledge-vault-massive-database-facts/; 4 pages.
Open Knowledge Foundation; "Facts and Databases"; Feb. 9, 2009, by Rufus Pollock; https://blog.okfn.org/2009/02/09/facts-and-databases/; 3 pages.
Chris Burges et al; "Learning to Rank using Gradient Descent"; ICML '05: Proceedings of the 22nd international conference on Machine learning, p. 89-96. New York, NY, USA, ACM Press, (2005); DOI: 10.1145/1102351.1102363; URL: http://portal.acm.org/citation.cfm?id=1102351.1102363; 8 pages.
C.J.C. Burges et al; "Learning to Rank with Non-Smooth Cost Functions"; Advances in Neural Information Processing Systems 19 (NIPS 2006); 8 pages.
Michael Taylor et al; "SoftRank: optimizing non-smooth rank metrics"; WSDM '08: Proceedings of the 2008 International Conference on Web Search and Data Mining; Feb. 2008; pp. 77-86; https://doi.org/10.1145/1341531.1341544; 10 pages.
Faiss, "Welcome to Faiss Documentation", Facebook AI Similarity Search, retrieved from https://faiss.ai/, on Dec. 13, 2022 (original publication date unknown), 3 pages.
Ann-Benchmarks, "Benchmarking Results", retrieved from http://ann-benchmarks.com/index.html on Dec. 13, 2022 (original publication date unknown), 27 pages.

\* cited by examiner

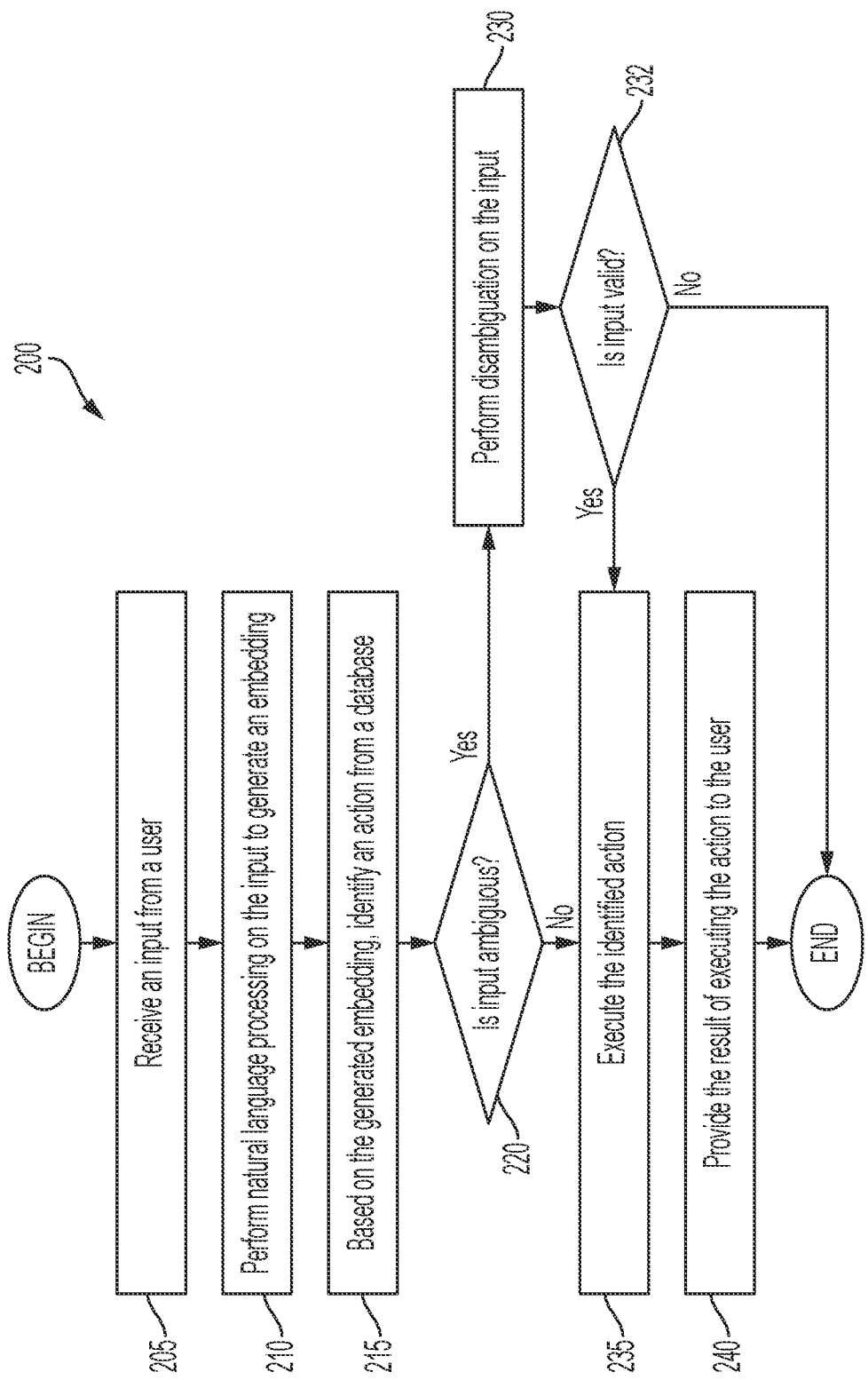

```
{
    "component": "e-chat server intent",  ← 335
    "version": "v1",
    "msg": "Roll, when was Eric born?",  ← 330
    "params": {
        "command": "query",
        "language": "en-US",
        "personID": "1cf64fd3-3e68-4a00-98a8-d0e46c8e30fa",
        "userRoles": [
            "person",
            "clientadmin",
            "manager",
            "payrolladmin",
            "employee"
        ]
    },
    "accessToken": "eyJhbGciOiJSUzI1NiIsInR5cCI6IkpXVCJ9.eyJ0eXBlIjoiZV9hdXRob3J
}
```

FIG. 3

```
{
    "name": "BirthDate",
    "roles": [
        "moreThanEmployee",
        "owner"
    ],
    "train_dataset": [
        "What is my birth date?",
        "my birth date",
        "my birth",
        "birth", "When I was born?",
        "was born",
        "born",
        "was born"
    ],
    "test_dataset": [
        "Hi, what is my birth date?",
        "Roll, what is my birth date?", "Tell me my birth date",
        "Give me my birth",
        "Can I have my birth", "Hi, when I was born?",
        "Roll, when I born?"
    ],
    "output_schema": "StandardchatMessage",
    "output_type": "String",
    "execution_type": "realtime",
    "script_function": "birthDate.py"
}
```

FIG. 5B

| | Utterance | Answer | GroundTruth | ScriptExecuted | Matched |
|---|---|---|---|---|---|
| 0 | Can I have my compensations package? | [{'code': 'Regular... | getCompensations.py | getCompensations.py | TRUE |
| 1 | Please, my payments | {'Net': $294.60... | getPayments.py | getPayments.py | TRUE |
| 2 | Hi, my w2, please? | Unfortunately,... | getW2.py | getW2.py | TRUE |
| 3 | Hi, my compensations package, please? | [{'code': 'Regular... | getCompensations.py | getCompensations.py | TRUE |
| 4 | Hi, what is my personal email? | owner_michigan... | personalEmailAddress.py | personalEmailAddress.py | TRUE |
| 5 | Hi, when is my next pay date? | Unfortunately,... | getNextPayDate.py | getNextPayDate.py | TRUE |
| 6 | Roll, my next pay date, please? | Right now, I do... | getNextPayDate.py | getNextPayDate.py | TRUE |
| 7 | Hi, what is earnings? | {'Regular Pay':... | getEarnings.py | getEarnings.py | TRUE |
| 8 | Hi, I want to know my civil status | I don't have... | getMaritalStatus.py | getMaritalStatus.py | TRUE |
| 9 | Roll, what is my business address? | 22155 Michigan... | getBusinessAddress.py | getBusinessAddress.py | TRUE |
| 10 | Do you know my personal email, please? | owner_michigan... | personalEmailAddress.py | personalEmailAddress.py | TRUE |
| 11 | Tell me my fund draft | {'Fund Draft Da... | getFundDraftDates.py | getFundDraftDates.py | TRUE |
| 12 | Give me my salary | {'Regular Pay':... | getEarnings.py | getEarnings.py | TRUE |

FIG. 6

| | Utterance | Answer | GroundTruth | ScriptExecuted | Matched |
|---|---|---|---|---|---|
| 13 | Hi, my next pay date, please? | Unfortunately,... | getNextPayDate.py | getNextPayDate.py | TRUE |
| 14 | Please Roll, give me my work location | 22155 Michigan... | getBusinessAddress.py | getBusinessAddress.py | TRUE |
| 15 | Roll, what's my email? | owner_michigan... | personalEmailAddress.py | personalEmailAddress.py | TRUE |
| 16 | Roll, who am I? | owner_michigan... | preferredFormattedName.py | preferredFormattedName.py | TRUE |
| 17 | Tell me my w2 | Unfortunately,... | getW2.py | getW2.py | TRUE |
| 18 | Hi what is my company name? | Company Test I... | getCompanyName.py | getCompanyName.py | TRUE |
| 19 | Hi, what is my compensations? | [{'code': 'Regular... | getCompensations.py | getCompensations.py | TRUE |
| 20 | please, my email? | owner_michigan... | personalEmailAddress.py | personalEmailAddress.py | TRUE |
| 21 | Can I have my next pay date? | Unfortunately,... | getNextPayDate.py | getNextPayDate.py | TRUE |
| 22 | Tell me my next pay date | Right now, I do... | getNextPayDate.py | getNextPayDate.py | TRUE |
| 23 | Roll, my what is my salary, please? | {'Regular Pay'... | getEarnings.py | getEarnings.py | TRUE |
| 24 | my email? | owner_michigan... | personalEmailAddress.py | personalEmailAddress.py | TRUE |
| 25 | Roll, what is my w2? | Right now, I do... | getW2.py | getW2.py | TRUE |

FIG. 6
CONTINUED

```
2021-11-01 18:11:13,212 - ranker - INFO | Instantiating Document Ranker Concrete Class, Ranking Strategy: faiss flat wrapper
2021-11-01 18:11:13,213 - faiss flat wrapper - INFO | !!! Indexing Faiss Ranker !!!
2021-11-01 18:11:13,213 - s3 utils - INFO | Reading embeddings dataset from s3
2021-11-01 18:11:13,213 - s3 utils - INFO | [Bucket] : adp-e-dit-knowledge-base
2021-11-01 18:11:13,213 - s3 utils - INFO | [Key] : facts/facts_dataset.pkl
2021-11-01 18:11:14,284 - lambda function inference - INFO | ..: Starting Knowledge Facts Lambda :..
2021-11-01 18:11:14,284 - lambda function inference - INFO | Question: Roll, when Eric born? PersonID: 1cf644d3-3e68-4a00-96a8-d0e46c8e30...
2021-11-01 18:11:14,743 - i18n - INFO | i18n connector type: http
2021-11-01 18:11:14,743 - i18n - INFO | Instantiating i18n concrete class
2021-11-01 18:11:14,743 - http - INFO | HTTP Wrapper
2021-11-01 18:11:14,743 - http - INFO | Locale path: https://internal-us-east-1.dit.acneai.com/localization/v1/localize/message/format
2021-11-01 18:11:14,743 - http - INFO | Module name: RollKnowledgeChat
2021-11-01 18:11:14,743 - i18n utils - INFO | Setting language to 'en-US'.
2021-11-01 18:11:14,743 - disambiguation service - INFO | Starting Disambiguation service
2021-11-01 18:11:14,985 - person resolver - INFO | QUERY TYPE: entitled
2021-11-01 18:11:14,985 - person resolver - INFO | Getting entity list WITH entitlement.
2021-11-01 18:11:15,126 - disambiguation service - INFO | My self? : False
2021-11-01 18:11:15,126 - disambiguation service - INFO | Question is about other person.
2021-11-01 18:11:15,126 - disambiguation service - INFO | Case 2 - [Multiple ones] - Generating Person Select List:
2021-11-01 18:11:15,126 - disambiguation service - INFO | Name: Harper Eric PersonID: 5524c1ea-b00b-43d6-83e7-9d1d184f85fb
2021-11-01 18:11:15,126 - disambiguation service - INFO | Name: Eric Anthony PersonID: c68e3dd9-83c0-49e7-ac9f-a8e6af279aa
2021-11-01 18:11:15,126 - i18n utils - INFO | Getting i18n text: key: KPdisambiguation_language; en-US values: [('Harper Eric', 'Eric Ant...
```

FIG. 7

KNOWLEDGE FACT RETRIEVAL THROUGH NATURAL LANGUAGE PROCESSING

BACKGROUND

1. Technical Field

Currently claimed embodiments of the invention relate to a system for information retrieval, and more specifically, to a system for real-time information retrieval for contextualized facts.

2. Discussion of Related Art

Where a database deals with numbers and texts, knowledge facts deal with facts. When a user types "Where was Madonna born", for example, the place given is pulled from existing storage. Such information can be retrieved from various data sources, such as graphs, spreadsheets, and so forth. The ability to answer facts to end-users is crucial to enhance the experience and provide meaningful information for customers.

For modern systems like virtual assistants, a natural-language processing engine should consume and answer the correct fact, based on the incoming question done by the users. The system should be able to answer factual questions by users such as, "What's my next pay date?" "Please, what is Philip's email address?" and "Hey, I need my paychecks!" as examples. These examples demonstrate the complexity of the process to interpret and retrieve the correct information in a way that the adoption of new facts can be easy and fast to support new capabilities.

SUMMARY

According to an embodiment of the invention, a method for fact retrieval includes receiving an input from a user, said input comprising a string of text that represents a user intent; performing natural language processing on the input to generate an embedding that corresponds to a semantic representation of the string of text; based on the generated embedding, identifying from a group of actions an action associated with the user intent, where each action in the group of actions is associated with a pre-determined embedding in a group of pre-determined embeddings; executing the identified action, where the executed action returns a result associated with the user intent; and providing the result to the user.

According to an embodiment of the invention, a non-transitory computer-readable medium stores a set of instructions for fact retrieval, which when executed by a computer, configure the computer to receive an input from a user, said input comprising a string of text that represents a user intent; perform natural language processing on the input to generate an embedding that corresponds to a semantic representation of the string of text; based on the generated embedding, identify an action from a group of actions, the action being associated with the user intent, where each action in the group of actions is associated with a pre-determined embedding in a group of pre-determined embeddings; execute the identified action, where the executed action returns a result associated with the user intent; and provide the result to the user.

BRIEF DESCRIPTION OF THE DRAWINGS

Further objectives and advantages will become apparent from a consideration of the description, drawings, and examples.

FIG. 2A shows a process for fact retrieval performed by the predictor in some embodiments

FIG. 3 shows an example of a data structure that is provided as the request payload in some embodiments.

FIG. 5B illustrates an example of a fact descriptor used in some embodiments.

FIG. 6 shows an example of a training and validation data set used to validate the system in some embodiments.

FIG. 7 shows an example of an output log for an entire execution process in some embodiments.

DETAILED DESCRIPTION

Figure 1A:
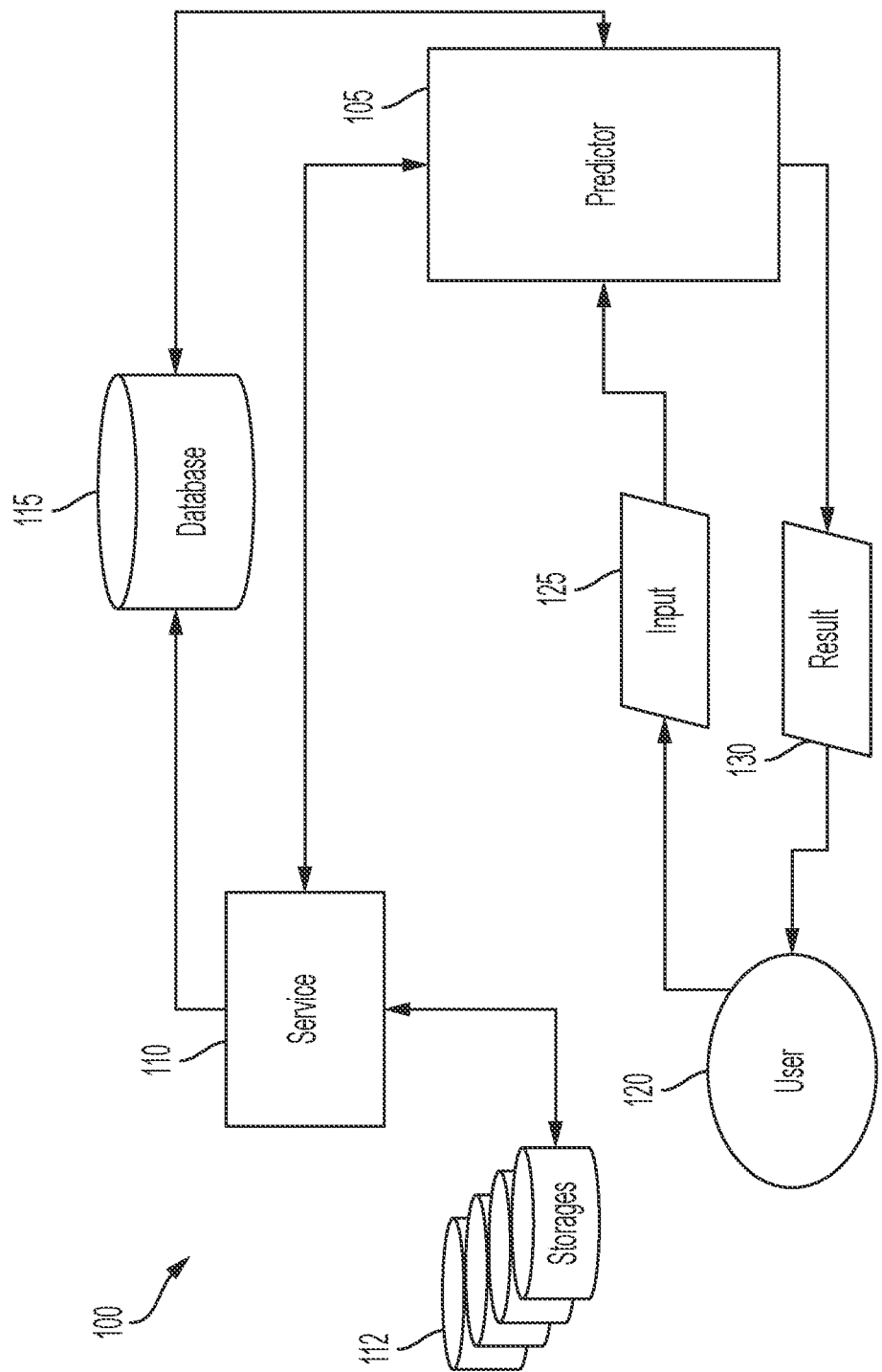
FIG. 1A shows an example of a system of some embodiments for real-time retrieval of contextualized facts.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed, without departing from the broad concepts of the current invention. All references cited anywhere in this specification, including the Background and Detailed Description sections, are incorporated by reference as if each had been individually incorporated.

The term "embedding" as used herein refers to a transformation of text into a numeric vector that is a semantic representation of the text. The vector may include, for example, floating point numbers, integers, or any combination thereof. The length of the vector indicates the number of dimensions of a hyperspace (also referred to as a hyperplane), and the vector indicates a position within that hyperplane that encodes the semantic meaning of the text. The vector values may also be referred to as an "embedding."

The term "indexing" as used herein refers to storing the vectors as rows in a database (also referred to as a "dataframe"). The database include fields corresponding to the original text and to the vector values. The database may also include an action, e.g., a command, a program, a script, etc. that is associated with the utterance. The database may be sortable or accessible by reference to any of the fields.

The term "utterance" as used herein refers to a natural language string of text from a user. Examples of utterances include queries and requests by the user for information, and statements or commands by the user to perform an action. The utterance may be received as a spoken utterance (e.g., via a microphone on a device and converted to text using speech recognition), a written utterance (e.g., typed into the device using a text entry user interface such as an on-screen keyboard, a physical keyboard, etc.), or any other form of natural language input that can be converted to a string of text. The utterance represents the user's intent, and natural language processing can be used to extract the user's intent and translate that intent into an action or a query.

The term "fact" or "knowledge fact" as used herein refers to information that is associated with the user's utterance. The fact may be an answer to a query (e.g., "what is my next pay date?") or a response or status of a command (e.g., "run payroll for Bob."). In some embodiments, the facts include aggregated facts including but not limited to mean/median statistics, seasonal and time-series information, analytics, and other classification models required for the business. In some embodiments, each fact is associated with a corresponding action to be performed. As an example, a query "what is my salary?" the corresponding fact may be the salary figure, and the corresponding action may be a salary query to a payroll database.

The term "disambiguation" as used herein refers to a process for Named Entity Recognition (NER) and Disambiguation. As an example, consider the question "Can I see Robert's ID that expired in April?" The NER process is responsible for identifying "I" and "Robert" as person entities, "ID" as a document entity and finally "April" as a date (month) entity. Furthermore, the system has to be able to recognize the subject of the fact among the identified entities. Disambiguation refers to identifying which "Robert" person entity is being referred to, in the event that there is more than one possible match. In some cases, contextual information in the query is sufficient to perform disambiguation. In other cases, disambiguation may require additional user input.

In the above example, "I" is the actor (the person making the question, equivalently referred to as the user) and "Robert" is the subject of the fact being asked. There are also situations where the entity is not explicitly present in the sentence: if the user types "Hey please, what's my birth date?", the query is about the actor themselves. If the user types "What's Eric birth date", this is a question about another person and, if the system finds more than one employee named "Eric", it checks which ones the actor is allowed to access, and returns a message with the list of authorized persons as disambiguation options for the actor to select the desired one.

FIG. 1A shows an example of a system 100 of some embodiments for real-time retrieval of contextualized facts. The system 100 includes a predictor 105, a service 110 for querying multiple storages 112, and a database 115 (equivalently referred to as a data frame) that stores an index of actions to perform in response to different user intents. A user 120 interacts with the predictor 105 by providing an input 125 (equivalently referred to as an utterance). The predictor 105 receives the input 125 and determines the context corresponding to the user's intent, and identifies the best way to retrieve a result 130 of that input (equivalently referred to as a fact) fact that is relevant to the user's intent.

To obtain the result 130 that is most relevant to the user's intent, the predictor 105 queries one of the multiple storages 112 (equivalently referred to as datastores) via the service 110. The service 110 is flexible enough to allow multiple storages 112 to be used as data sources to fetch and find the most relevant result 130. The result 130 is then returned to the predictor 105 which then returns to the user 120.

In some embodiments, the service 110 is a generic mechanism (e.g., a reflection mechanism), to execute the script in a generic and automated manner. This implementation enables the service 110 to abstract the function call in a manner that is agnostic towards the actual storages 112, allowing many different types of platforms to be used.

In some embodiments, the system 100 may be a set of software development components deployed in a cloud solution, with a serverless implementation that enables scalability and control of the computational resources by demand. Features of a serverless implementation include reducing costs when the system is not being used. In other embodiments, a server-based implementation may be used.

Figure 1B:
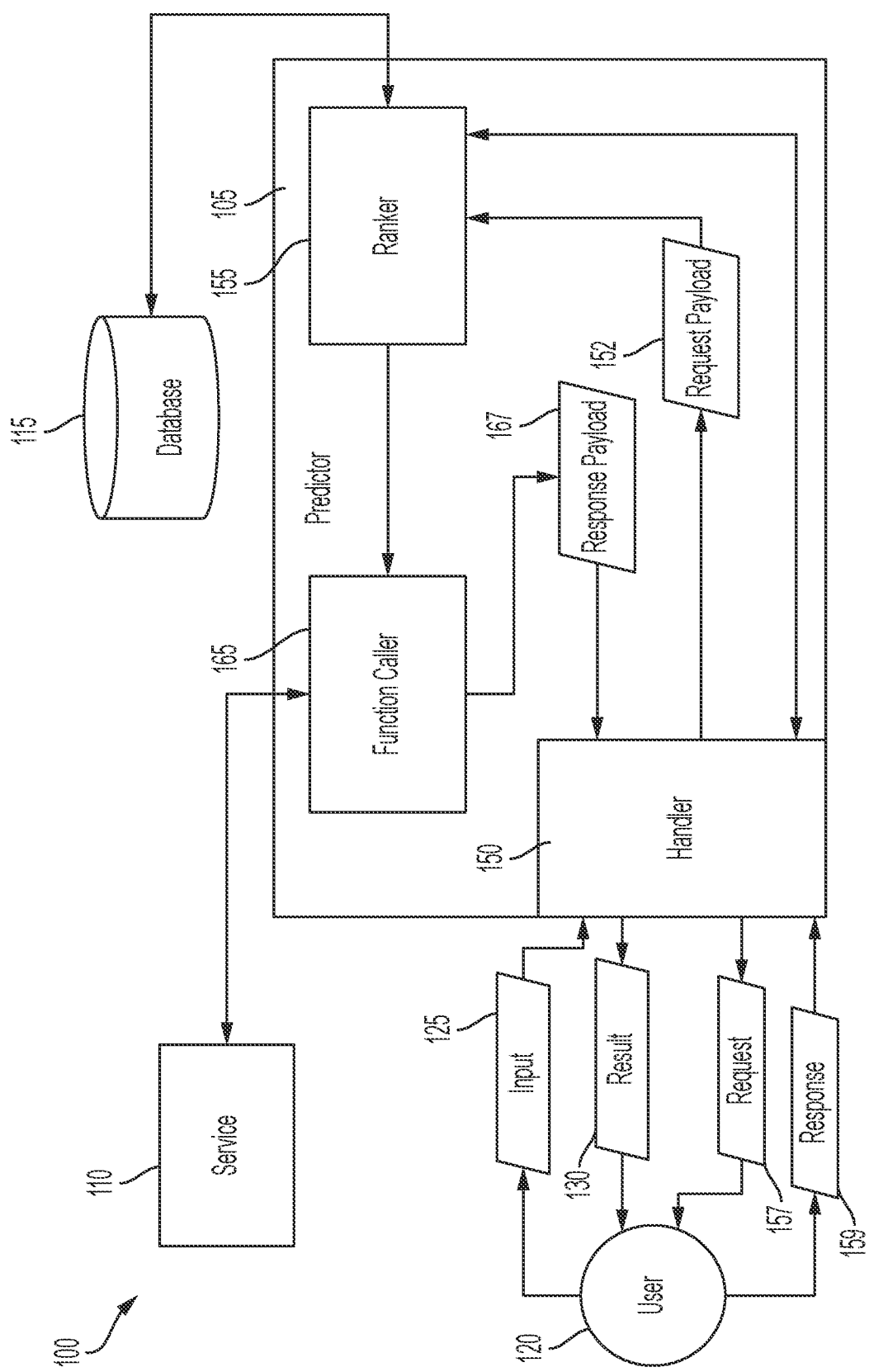
FIG. 1B shows a conceptual illustration of a predictor in some embodiments.

FIG. 1B shows a conceptual illustration of the predictor 105 in some embodiments. The predictor 105 may include a handler 150 for receiving the input 125 from the user 120 and providing the result 130 to the user 120. The handler 150 may also extract a request payload 152 from the input 125, so that the predictor 105 may perform inference on the request payload 152 to determine the user intent and which corresponding action from the database 115 to execute. In some embodiments, there may be multiple actions that correspond to the input 125, in which case a ranker 155 performs a ranking to determine which action is the best action to execute.

If necessary, the predictor 105 may also perform disambiguation on the request payload 152 to resolve uncertainty regarding the object of the action to be executed. In some cases, the predictor 105 may be able to perform disambiguation internally. In other cases, the predictor 105 may send a disambiguation request 157 to the user 120 and receive a disambiguation response 159. In some embodiments, the predictor 105 sends and receives the disambiguation request 157 and response 159 via the handler 150.

The predictor 105 may provide the action, and optionally, other contextual information from the request payload 152, to a function caller 165. The function caller 165 queries the service 110 and receives a corresponding response payload 167, which is then packaged into a result 130 that is provided to the user 120 (e.g., via the handler 150).

Figure 1C:
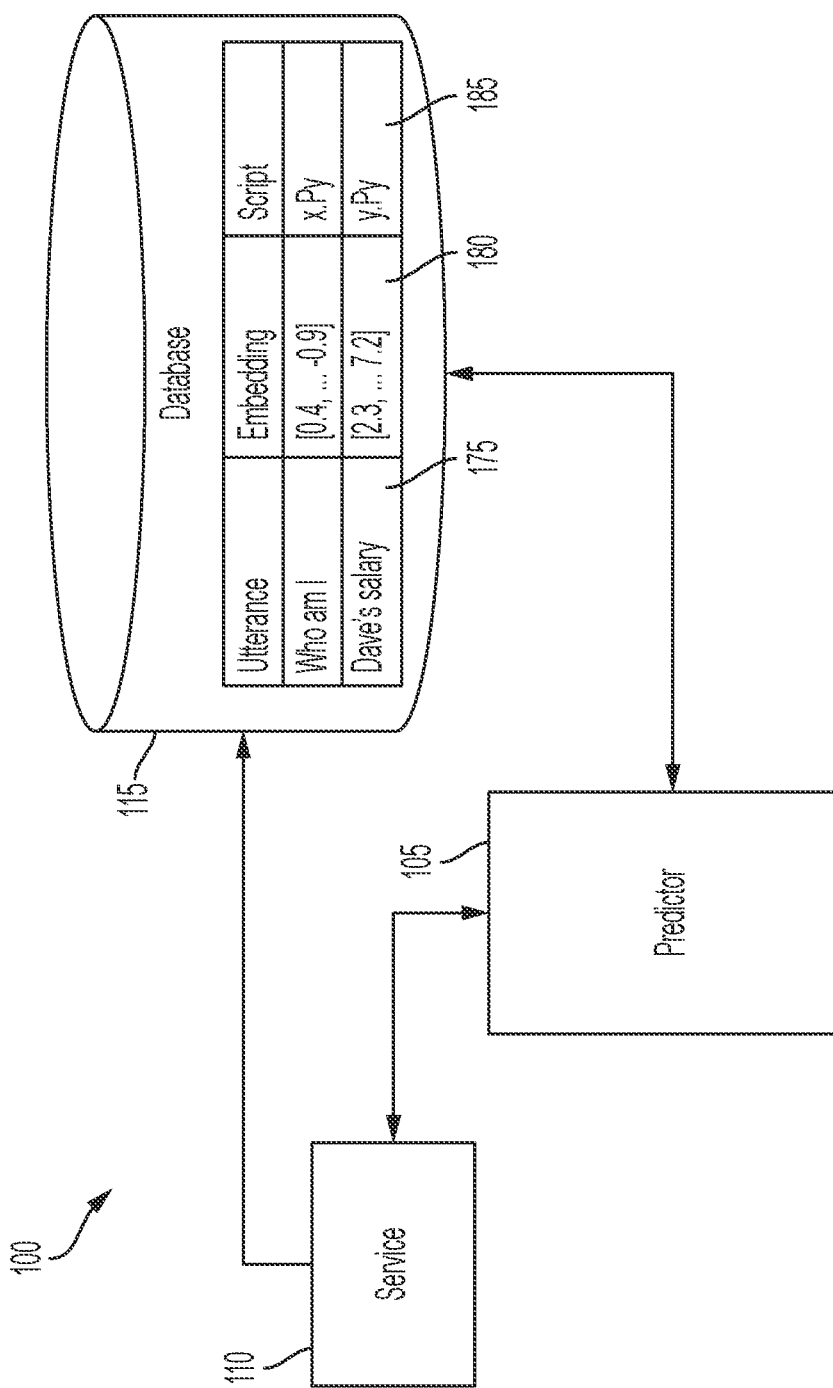
FIG. 1C shows a conceptual illustration of a database in some embodiments.

FIG. 1C conceptually illustrates the database 115 of some embodiments. The database 115 stores a table that associates utterances 175 with their embeddings 180 and the corresponding actions 185. In some embodiments, the actions 185 are scripts that are executed by the service 110 to access the storages 112. The database 115 is populated by the service 110 during training, and is referenced by the predictor 105 during inference.

The various components of the system 100, the predictor 105, and the database 115, as shown in FIGS. 1A-1C, may be implemented in some embodiments as separate software or hardware modules. In some embodiments, different components may be combined into a single component, or one component may actually be comprised of multiple sub-components.

FIG. 2A shows a process 200 for fact retrieval performed in some embodiments by the predictor 105. In some embodiments, at least two different operations of process 200 may be performed by different components of the predictor 105.

The process 200 begins at 205 by receiving the input 125 from the user 120. In some embodiments, the input 125 is received by the handler 150 of the predictor 105. The input 125 may include a string of text that represents a user's intent. For example, the user 120 may type a question in a chat interface of a device, and the question text may be packaged (e.g., by the handler 150, or alternatively by the user's device) as a request payload 152 in JSON format.

In some embodiments, the input 125 may also include additional information or metadata associated with the user 120. This additional information or metadata may include, but is not limited to, a first-person identifier associated with the user 120, and a role attribute associated with the user 120. For example, the string of text may refer to multiple entities, such as persons, documents, dates, job positions, places and companies. These entities can express different aspects of the fact being asked, like the subject, a modifier, or even the fact itself.

In some embodiments, the predictor 105 receives the input 125 from the user 120 in the form of a data structure. For example, the data structure may be a JavaScript Object Notation (JSON) structure. The string of text may be stored as a field within the JSON structure, for example, with additional metadata and information being stored in other fields. In some embodiments, the handler 150 packages the input 125 into a request payload 152 (e.g., in JSON format).

The user 120 may provide the input 125 through a user interface on a device, including but not limited to an interface on a mobile device, a web browser, or other device. The interface may be, for example, a text interface, a voice interface, or a graphical interface. In preferred embodiments, if the interface is a non-textual interface, the input 125 is converted to a string of text (e.g., by transcribing the voice input, interpreting the graphical input, etc.). The device may package the input 125 into a request payload 152 and provide to the predictor 105. An example of a request payload 152 is described below with reference to FIG. 3. Alternatively, the device may send the input to the predictor 105, along with other relevant metadata and information, which is packaged by the predictor 105 (e.g., by the handler 150) into the request payload 152.

At 210, the process 200 performs natural language processing (NLP) on the input 125, to generate an embedding that corresponds to a semantic representation of the string of text. More specifically, the embedding is a representation of the vector space of the string of text. In some embodiments, the ranker 155 generates the embedding.

In some embodiments, the embedding is generated using a natural language processing tool, including but not limited to Doc2Vec, SentenceBERT, InferSent, and Universal Sentence Encoder, that treats the string of text as a sentence. For example, if user types the text "what was my salary in June?" into a chat interface, the process 200 may convert this to a vector with a pre-determined length (e.g., dimensionality) N such as 512, 1024, etc. The N values of the vector may be floating-point values, such as 0.231, −0.021, 0.454, 0.912, etc.

At 215, the process 200 identifies, based on the generated embedding, an action from the database 115. The action is associated with the user's intent, as expressed by the input 125. The database 115 stores utterances 175, pre-determined embeddings 180 (or representations thereof, e.g., compressed format) generated from those utterances 175, and actions 185 that are associated with the pre-determined embeddings 180.

In some embodiments, the ranker 155 identifies the action. The database 115 may be located locally to the ranker 155, or alternatively, stored remotely, for example on a cloud computing or storage service. In some embodiments, the database 115 is used to train the ranker 155, by providing data to build an index. In some embodiments, the index may be mean vectors extracted from the database 115 that correspond to average or representative embeddings, each pertaining to a specific action, for example. In such embodiments, any update to the database 115 results in a reindexing process that updates the local index at the ranker 155.

In some embodiments, the index may be a complex structure that organizes representations of the vectors extracted from the database to allow efficient search (prediction). The ranker 155 may use indexing techniques including, but not limited to, Hierarchical Trees, Inverted File Index, and Small World Graphs. In some embodiments, the ranker 155 may use neural network techniques including, but not limited to, Dual Encoders, RankNet, LambdaRank and SoftRank.

In some embodiments, the process 200 compares the generated embedding to at least a subset of the pre-determined embeddings 180, for example, by calculating a similarity or distance (in an N-dimensional hyperspace defined by the length of the vectors) between the respective vectors of the generated embedding and the pre-determined embeddings 180 (or subset thereof). The pre-determined embeddings 180 with the most similarity or the closest distance to the generated embedding is determined, and the associated action with that closest embedding is then identified.

In some embodiments, the process 200 compares the generated embedding to a set of basis embeddings that are generated from the pre-determined embeddings 180. The basis embeddings may be determined by grouping the pre-determined embeddings 180 by common action. The pre-determined embeddings 180 may be grouped by a multi-dimensional clustering algorithm, including but not limited to k-means clustering, mean-shift clustering, density-based clustering, expectation-maximization clustering, and hierarchical clustering.

The process of identifying the action is referred to as inference, defined as determining whether a set of conditions are matched and then classifying the best action to execute. In some embodiments, the action is a script (executed by the service 110 in some embodiments) to fetch the fact data from the storages 112. This script is responsible for orchestrating all the downstream validations required to succeed in the information retrieval.

The ranking strategy used by the ranker 155 is referred to as the inference kernel, and is responsible for the machine learning-based ranking task. In some embodiments, the Facebook AI Similarity Search (FAISS) is used for the inference kernel. FAISS is a library for efficient similarity search and clustering of dense vectors, that contains algorithms that search in sets of vectors of any size, up to ones that possibly do not fit in RAM. FAISS also contains supporting code for evaluation and parameter tuning. Importantly, FAISS has implementations of multiple ANN (Approximate Nearest Neighbor Search) techniques that help to scale semantic search to a large number of documents and also to run semantic search queries efficiently. Other ranking algorithms, including neural network-based algorithms, may be used in other embodiments, such as those mentioned in the ANN Benchmark [3], including but not limited to Dual Encoders, RankNet, LambdaRank, and SoftRank. From a software architecture perspective, a Wrapper class defines the abstraction for any concrete implementation.

In some embodiments, the process 200 may not find a matching action to the generated embedding. For example, if the process 200 is using a similarity or distance calculation, then there may be a threshold value beyond which the process 200 rejects any match. This scenario may arise if the user 120 provides completely irrelevant or unrecognizable input that is not accounted for in the database 115. In such cases, the process 200 ends.

At 220, the process 200 determines if the input 125 is ambiguous. If the process determines that the input 125 is not ambiguous, then the process 200 proceeds to 235, which is described in more detail below. If the process 200 determines that the input 125 is ambiguous, then the process 200 performs disambiguation at 230 on the input 125. In some embodiments, the ranker 155 makes the determination regarding whether the input 125 is ambiguous. After disambiguation, the process proceeds to 232, which is described in more detail below.

The disambiguation step represents the process to identify named entities on the incoming utterance. Once a named entity is identified, this information is used to match whether this entity is unique or other action to perform. Named entities include but are not limited to persons, documents, dates, job positions, places, and companies.

In some embodiments, for the case of person entities, there are at least four conditions supported for personal disambiguation:

(1) The question is about the actor (e.g. the user 120). This question concerns the same person asking the question. Examples: "What's my salary?" or "When is my next pay date?" etc. In this case, the system extracts the actor's name and ID to be used to retrieve the fact.

(2) The question is about other specific people. This question is related to a subject other than the actor person. Example: "What's Eric Smith's salary?" In this case, the system identifies the other person's name and updates the ID to be used to retrieve the fact, after verifying the permission to have access to it.

(3) The question needs to disambiguate. This question needs to be disambiguated because there is more than one person with the same name. Example: "What's Eric's salary? (In this case, there may be multiple people named Eric like Eric Smith, Eric Jones, and so forth). If this condition is triggered, the system returns a message asking the user to be specific and show the possible choices.

(4) The question is about someone unknown. This question is related to someone that could not be found. Example: "What's John Anderson's salary?" when there is no one named John Anderson employed by the company.

Those four conditions above are also applicable to other types of supported entities. For example, if the query refers to ID, the system may need to disambiguate between different forms of ID. If the query refers to a city name, the system may need to disambiguate between different cities in different states with the same name.

Disambiguation is fundamental to evaluate to whom, where, what, and when the input 125 is about and determine whether special treatment is needed. If disambiguation or an unknown condition is matched, then the system initiates the disambiguation process, which may include requesting the user 120 to clarify or select between multiple options.

At 232, the process 200 determines if the input 125 is valid. If the process determines that the input 125 is not valid, then the process 200 ends. If the process 200 determines that the input 125 is valid, then the process 200 continues to 235, which is described below. In some embodiments, the ranker 155 makes the determination regarding whether the input 125 is valid.

Determining whether the input is valid includes, but is not limited to, determining whether the named entities are valid, and determining if the user 120 is entitled to make the query. For example, as discussed below with reference to FIG. 3, the input 125 may include a USERROLES array 325 of role attributes that are associated with the user 120. Accordingly, the process 200 determines, based on the role attributes of the first user, whether the user 120 is authorized to receive the result 130 from the identified action.

In some embodiments, the process 200 performs entitlement (e.g., at 230 which is described above, or at 235, which is described below) by executing an authorization verification for the fact that the user 120 is requesting. For instance, if the user 120 is an employee (e.g., role attribute "employee") and asks about the business owner's salary, the process 200 will determine that the user 120 is not allowed to get such information. However, if the user 120 is the owner (e.g., having multiple role attributes like "payrolladmin", "manager", etc.) and asks about an employee's salary, the process 200 will determine that the user 120 is authorized, since the owner has the authorization to see all employees' salary. The entitlement process may include, but is not limited to, checking users' position as an employee of the company, the position of fact's subject person in the reporting chain of the organizational structure, and ad-hoc exceptions.

As an example of determining whether the named entities are valid, if "Eric" is not recognized as a Person Entity for the company, then the query is invalid since there is no object on which to perform the action.

In some embodiments, the ranker 155 requires feedback from the user 120 to perform disambiguation. The ranker 155 provides a disambiguation request 157 to the user 120. The disambiguation request 157 may, for example, include multiple options for the user 120 to select. The user's selection is then returned to the ranker 155 as a disambiguation response 159. In some embodiments, the handler 150 provides the request 157 from the ranker 155 to the user 120, and the response 159 from the user 120 to the ranker 155.

At 235, the process 200 executes the identified action. The executed action returns a result associated with the user intent. In some embodiments, the function caller 165 uses a reflection mechanism to execute the action and retrieve the desired fact from at least one appropriate storage 112. In some embodiments, the ranker 155 provides the identified action to the function caller 165, which then makes a function call to the service 110. In some embodiments, the function call is an instruction to the service 110 to execute a specific script corresponding to the identified action.

The ranker 155 also provides additional information to the function caller 165, such as the (optionally, disambiguated) name of any persons who are the object of the action, or other named entities as required by the service 110. For example, the ranker 155 may provide a first-person identifier associated with the user, or an identifier associated with another person, depending on the object of the query.

In some embodiments, the action is at least one script written in a scripting language such as Python. In some embodiments, the function caller 165 is a generic mechanism (referred to as a reflection mechanism), to execute the script in a generic and automated manner. This implementation enables the process 200 to abstract the function call in a manner that is agnostic towards the actual storages 112, allowing many different types of platforms to be used.

At 240, the process 200 provides the result of executing the action to the user. In some embodiments, the function caller 165 may package the result of the query (received from executing the action via the service 110) into a response payload 167 that is provided to the user 120 (e.g., via the handler 150). The process 200 then ends.

Figure 2B:
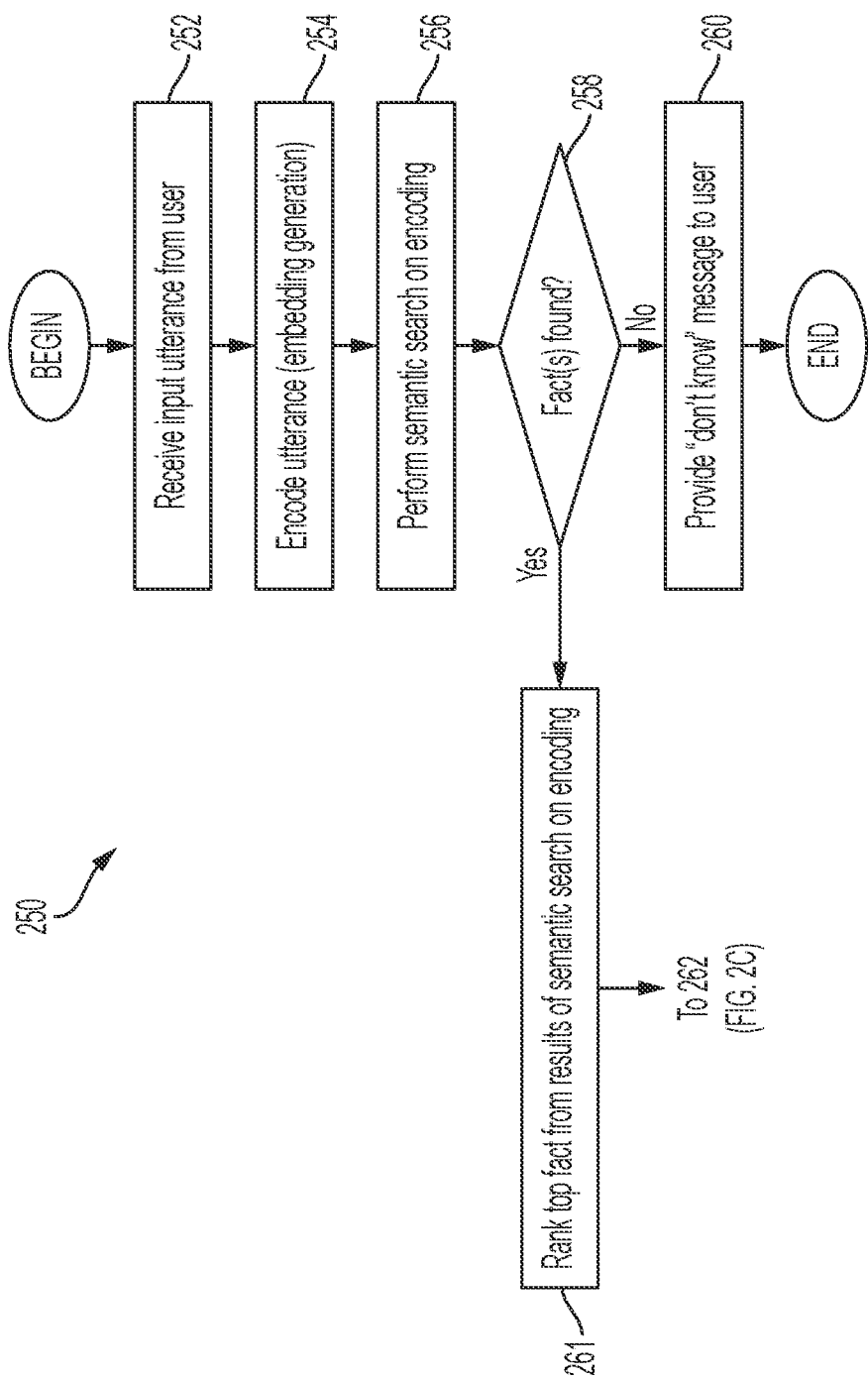
FIG. 2B shows a first portion of a process for fact retrieval performed by the predictor in some embodiments.
Figure 2C:
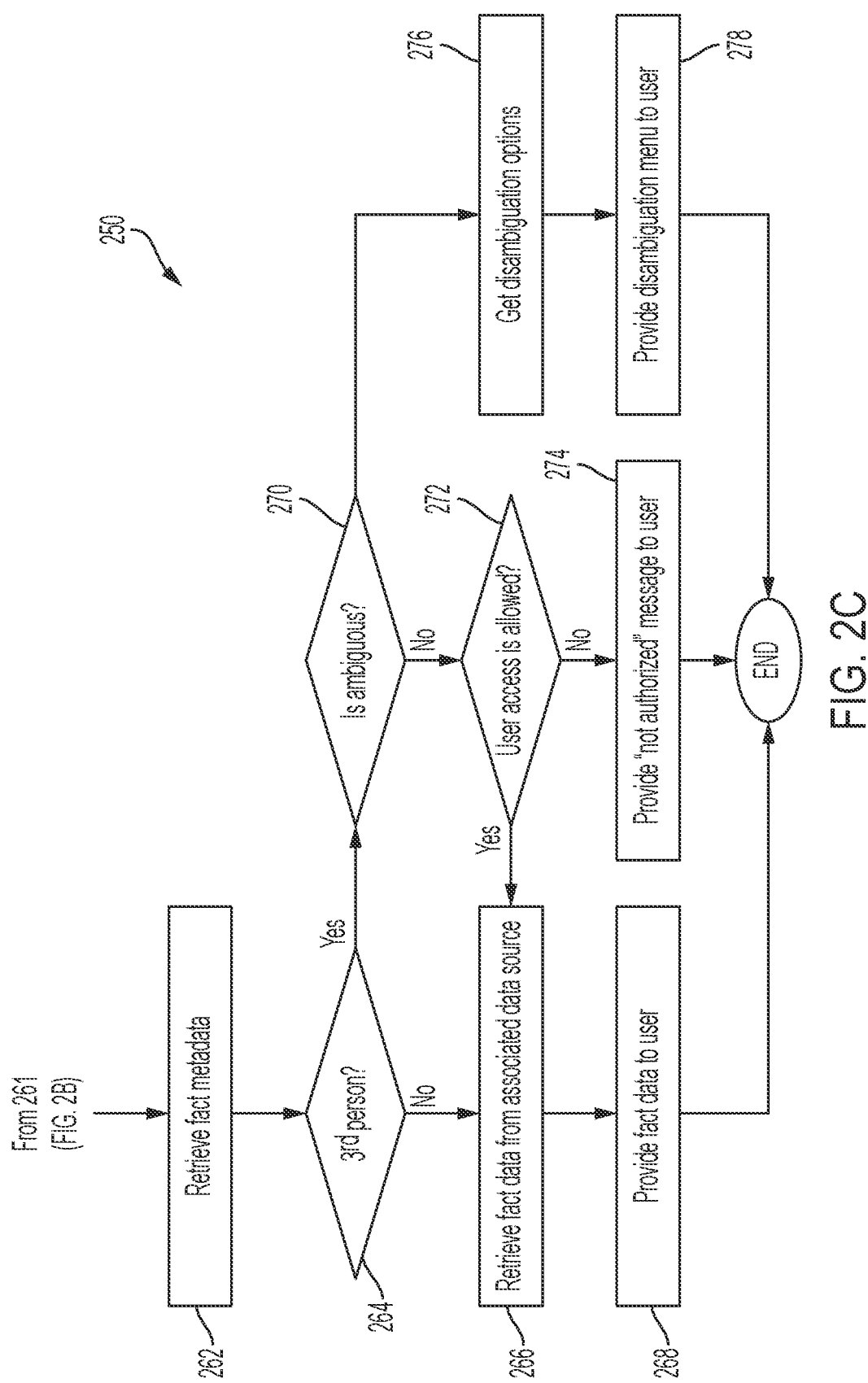
FIG. 2C shows a second portion of the process for fact retrieval shown in FIG. 2B.

FIGS. 2B and 2C show another example of a process 250 for fact retrieval performed in some embodiments by the predictor 105. The process 250 is similar to the embodiment of the process 200 discussed above with respect to FIG. 2A.

Any of the various features discussed with any one of the embodiments discussed herein may also apply to and be used with any other embodiments. As shown in FIG. 2B, the process 250 begins at 252 by receiving an input utterance from a user.

As an example, an utterance may be from a user Hans, who is an employee of Acme Corporation, and may be a text string "what is my salary?" typed into a chat interface of an application executing on a mobile device or computer, or running within a web browser.

At 254, the process 250 encodes the utterance, by generating an embedding that corresponds to a semantic representation of the utterance. In some embodiments, the embedding is a vector representation, used by an approximate nearest neighborhood (ANN) algorithm. In other embodiments, the embedding may be another type of mathematical representation, for example an encoding used by a convolutional neural network (CNN) algorithm. As an example, the encoded utterance may be a vector of N floating point numbers (e.g., N=256, and each number in a range between −0.01 and +0.01).

At 256, the process 250 performs a semantic search on the encoded utterance. The search may return multiple facts that match the encoded utterance, and by performing the ranking process, the top-matching fact may be identified. Alternatively, the search may not return any relevant facts.

For example, in some embodiments, a similarity score threshold may be predetermined, and for a fact to be identified as a potential match, a similarity score may be calculated between the encoded utterance and each available fact (e.g., facts stored in an index). If the similarity score for a particular fact exceeds the threshold, then that particular fact is identified as a potential match for the utterance. If the similarity score does not exceed the threshold, then that particular fact is not identified as a potential match.

At 258, the process 250 determines whether there are any facts that have been identified as potential matches to the utterance. If no matching facts have been found, the process 250 proceeds to 260 and provides a "don't know" error message to indicate that the utterance is not recognized. The process 250 then ends. If the process 250 determines that facts have been found, the process 250 proceeds to 261, which is described below.

At 261, the process 250 ranks the facts that were identified as potential matches to the utterance during the semantic search on the encoded utterance. If there is only a single matching fact, the process 250 may omit operation 261 in some embodiments. The top-ranking fact is selected as the correct fact in reply to the utterance. The process 250 then continues to 262, which is described below, as described in reference to FIG. 2C.

In the example introduced above, the matching fact to Hans' query about his salary may be a fact labeled "Regular Pay", associated with a script called getEarnings.py. In this example, the fact is script written in the Python language, which requires as input various metadata such as Hans' employee ID and which when executed performs a query to a specific database that stores salary data.

As shown in FIG. 2C, at 262 the process retrieves metadata associated with the identified matching fact. This metadata may include information that may be used to identify whether the utterance refers to a $3^{rd}$ person, specify the user's role, and other types of contextual information that may be needed to obtain the data corresponding to the fact.

At 264, the process 250 determines whether the utterance is a third-person query that refers to a different person than the user who issued the utterance. If the process 250 determines that the utterance refers to a third person, then the process 250 continues to 270, which is described below. If the process 250 determines that the utterance does not refer to a third person (e.g., that the utterance refers to the user), then the process 250 continues to 266, which is described below.

In the example introduced above, Hans' query about his salary does not refer to a third person, since he is asking about his own salary. Accordingly, Hans' query about his salary is a first-person query, not a third-person query. However, were Hans to issue a subsequent query about John's salary, that would be an example of an utterance referring to a third person.

At 266, after determining that the utterance is not a third-person query, the process 250 retrieves fact data from a data source associated with the fact. In some embodiments, the process 250 identifies the data source and determines how to retrieve the fact data from the data source, based on the fact metadata. In the example introduced above, the data source would be a payroll database, the fact data would be Hans' actual salary, and the process 250 would retrieve that fact data by performing a query to the database, using the fact metadata (e.g., Hans' employee ID) as an input to that query.

At 268, the process 250 provides the retrieved fact data to the user. The process then ends.

At 270, after determining that the utterance is a third-person query, the process 250 determines if the utterance is ambiguous. If the process 250 determines that the utterance is not ambiguous, then the process 250 proceeds to 272, which is described below. If the process 250 determines that the utterance is ambiguous, then the process 250 proceeds to 276, which is described below. In some embodiments, the process 250 makes the ambiguity determination using at least some of the fact metadata.

In the example introduced above, Hans' second query is regarding John's salary, so if there is more than one employee named John, the utterance is ambiguous. However, if Hans' utterance were to include enough information to forestall any ambiguity (e.g., by providing John's full name, John McClane), then the utterance would not be ambiguous.

At 272, the process 250 determines is the user is allowed to access the fact data. If the process 250 determines that the user is allowed to access the fact data, then the process 250 proceeds to 266, which was described above. If the process 250 determines that the user is not allowed to access the fact data, then the process 250 proceeds to 274, which is described below. In some embodiments, the process 250 makes the access determination using at least some of the fact metadata, e.g., user role information.

At 274, after determining that the user is not allowed to access the fact data, the process 250 provides a "not authorized" message to the user. The process 250 then ends.

In the example introduced above, if Hans is a manager and John is an employee under Hans' supervision, then Hans may be authorized to access the fact data (e.g., John's salary). However, if Hans is another employee, then Hans may not be authorized to access salary information.

In some embodiments, the user may not be allowed to access the fact data for other reasons than user role attributes. As a non-limiting example, due to different privacy laws in different states or countries, the geographic location of the user, the third person (if applicable), or both may be a factor in determining whether the user is allowed to access the fact data.

At 276, after determining that the utterance is ambiguous, the process 250 retrieves disambiguation options. In some embodiments, the process 250 retrieves the disambiguation options using at least some of the fact metadata.

In the example introduced above, if there are multiple employees named John, then the process 250 may attempt to query the salary database using the name "John" and receive, instead of salary data, an error message. The error message may itself contain disambiguation options, or the process 250 may interpret the error message and make an additional query to the salary database to request the disambiguation options. In this example, the disambiguation options would be a list of full names of all employees named John. This list may be filtered by excluding those employees to which Hans does not have access.

At 278, the process 250 provides the disambiguation options to the user. The disambiguation options may be presented, for example, as a menu for the user to select from. The process 250 then ends.

In some embodiments, the determinations whether a fact is found (at 258), the utterance refers to a $3^{rd}$ person (at 264), whether the utterance is ambiguous (at 270), and whether the user is allowed to access the fact (at 272) may be performed in a different order than shown in FIGS. 2B and 2C. The order in which the determinations are performed may be based on various factors, including but not limited to a computational cost expressed in units of time or in units of computing power.

FIG. 3 shows an example of a data structure 300 that is provided as the request payload 152 in some embodiments. In this example, the data structure 300 is a JSON structure, that may be created by a mobile application executing on a mobile device, or by the predictor 105 or a component thereof from the input 125 provided by the user 120.

In this example, the user 120 enters their query, "Roll, when was Eric born?" into the mobile application, and this is stored as a string of text within the MSG field 305. The data structure 300 also includes a COMMAND field 310 for storing the type of the user's input 125 (in this case, a query, as inferred by the grammar and the punctuation of the string of text), a LANGUAGE field 315 for storing the language encoding of the user's query, a PERSONID field 320 for storing an identifier associated with the user 120, and a USERROLES array 325 that contains all of the role attributes that are associated with the user 120. Note that in this example, this user's query refers to a third party named "Eric" that is not the same person as the user 120. The user 120 has various admin roles including "manager" and "payrolladmin" that may indicate that the user 120 has access to sensitive data such as Eric's birthdate.

In some embodiments, the data structure 300 may have internal structures and sub-structures to organize the data and metadata stored therein. For example, the parameter fields 310-325 are stored in a PARAMS array 330. At the top level of the data structure 300, there are only five fields, including a COMPONENT field 335, a VERSION field 340, and an ACCESSTOKEN field 345, that collectively describe the software environment and provide context for processing the data structure 300, the MSG field 305, and the PARAMS array 330. The hierarchical structure allows multiple levels of granularity, which enables more flexible processing for entitlement definition, disambiguation, named entity recognition, and other types of processing.

Figure 4:
FIG. 4. illustrates an example of a function call performed by the function caller to the service in some embodiments.

FIG. 4. illustrates an example of a function call 400 performed by the function caller 165 to the service 110 in some embodiments. In this example, the function call is a Python function to invoke the best-ranked script by the classifier. The function call 400 accepts as an argument the name of the action from the ranker 155, and then uses that argument to launch a related script at the service 110.

Figure 5A:
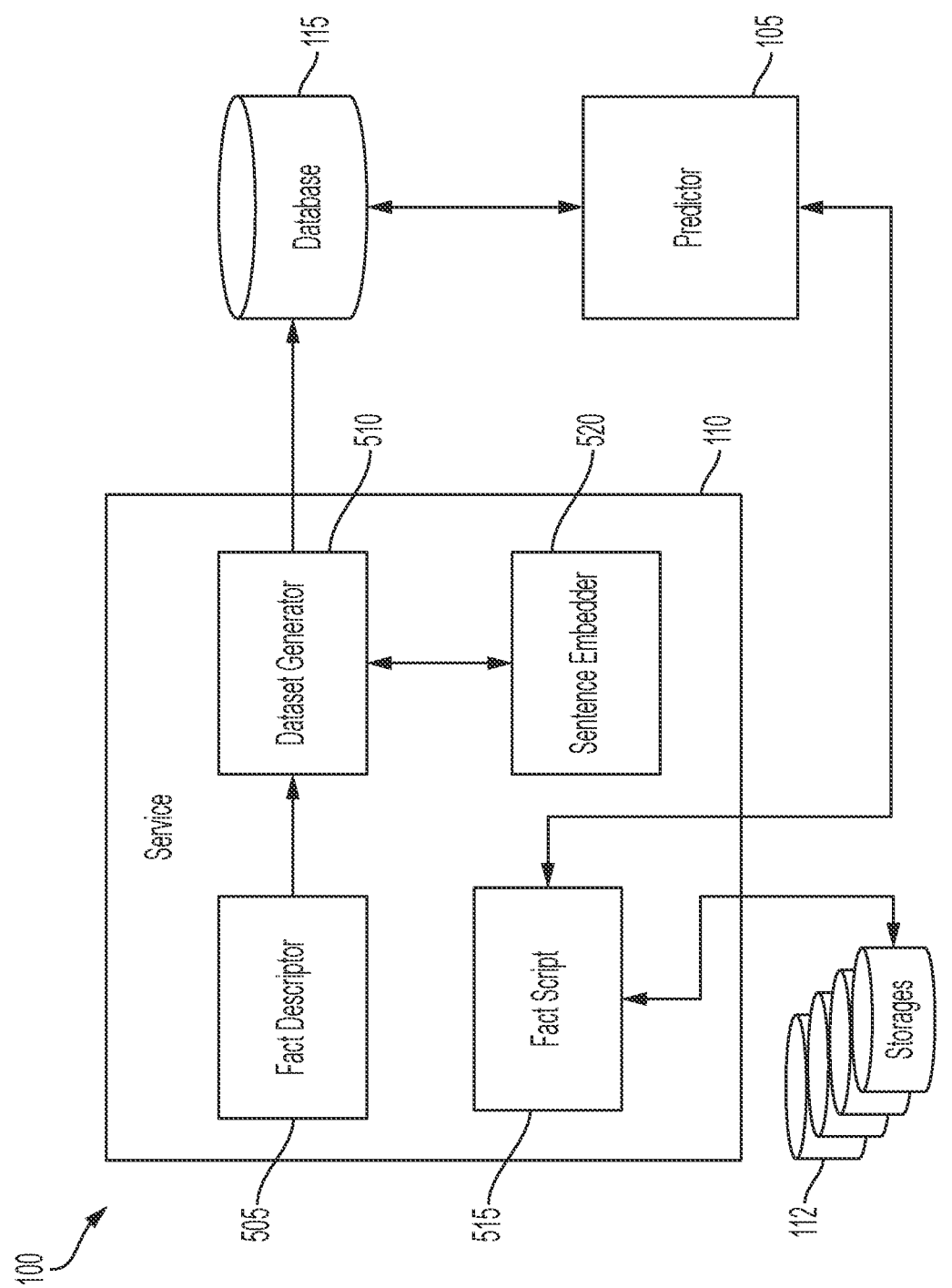
FIG. 5A shows a conceptual illustration of a service of some embodiments.

FIG. 5A shows a conceptual illustration of the service 110 of some embodiments. The service 110 has a number of components, including a fact descriptor 505, a dataset generator 510, a fact script 515, and a sentence embedder 520. These components are used by the service 110 for training the system 100 (e.g., by populating the database 115) and for inference requests by the system 100 (e.g., queries for fact retrieval from the predictor 105 in response to input 125 from the user 120).

For training, mappings between known user utterances and actions are defined in the fact descriptor 505. FIG. 5B illustrates an example of a fact descriptor 505 used in some embodiments. In this example, the fact descriptor 505 is a manifest file that includes the name of the fact 525, the roles 530 that are allowed to access the fact, the training utterances 540 and testing utterances 545 used to reindex and evaluate the classification model, and maps the script identification 550 to be run by the engine. The execution type 555 defines whether the information is from runtime or other types like cyclic extract-transform-load (ETL) processing or batch processing, for instance. In this example, the fact 525 is birthdate, and the training utterances 540 and the testing utterances 545 are different examples of user inputs that are known to be requesting that information. In some embodiments, a single fact descriptor file is used to define all the known facts and provide training and testing utterances and other info accordingly. In some embodiments, multiple fact descriptor files may be used, each having one or more facts defined therein.

In some embodiments, each fact descriptor file may be any file type, including but not limited to a text file, a CSV file, a JSON file, a word processing file (e.g., a DOC or DOCX file), a spreadsheet file (e.g. an XLS or XLSX file), etc.

In some embodiments, the dataset generator 510 is used to parse each fact descriptor 505 and populate or update the database 115. In some embodiments, once the database 115 is populated or updated, it is uploaded to a cloud storage service to be available for consumption from the ranker 155 to train and retrain the classification model.

The database 115 contains several fields, including the embeddings 180 which are a representation of the vector space of a given utterance 175 typed by the user in the chat input. In some embodiments, the embeddings 180 are generated by the sentence embedder 520. The sentence embedder 520 may be a serverless engine that converts an utterance into a space vector representation, as well as calculate similarity or distance between such space vector representations.

For example, if user types the text "what was my salary in June?" into a chat interface, the sentence embedder 520 may convert this to a vector with a pre-determined length (e.g., dimensionality) N such as 512, 1024, etc. The N values of the vector may be floating-point values, such as 0.231. −0.021, 0.454, 0.912, etc.

The storages 112 may support multiple different database connection methods, including but not limited to MySQL, cloud databases, GraphQL, Open Database Connectivity (ODBC), Microsoft Excel, Oracle RDBMS, MongoDB, Neo4J, and other business logic solutions. In other words, the fact retrieval is agnostic of data source and post-processing. The fact script 515 allows new required business logic to be implemented and integrated with the whole inference engine.

In some embodiments, the script execution is done by a reflection mechanism (e.g., at the service 110, as in the example in FIG. 4) and the fact script 515 takes the mapped script name from the mapping file (e.g., the example in FIG. 5B). This automated mechanism lets the engine responsible to call the function and pass the incoming payload to get the desired parameters to run the business logic and return the fact properly.

Figure 5C:
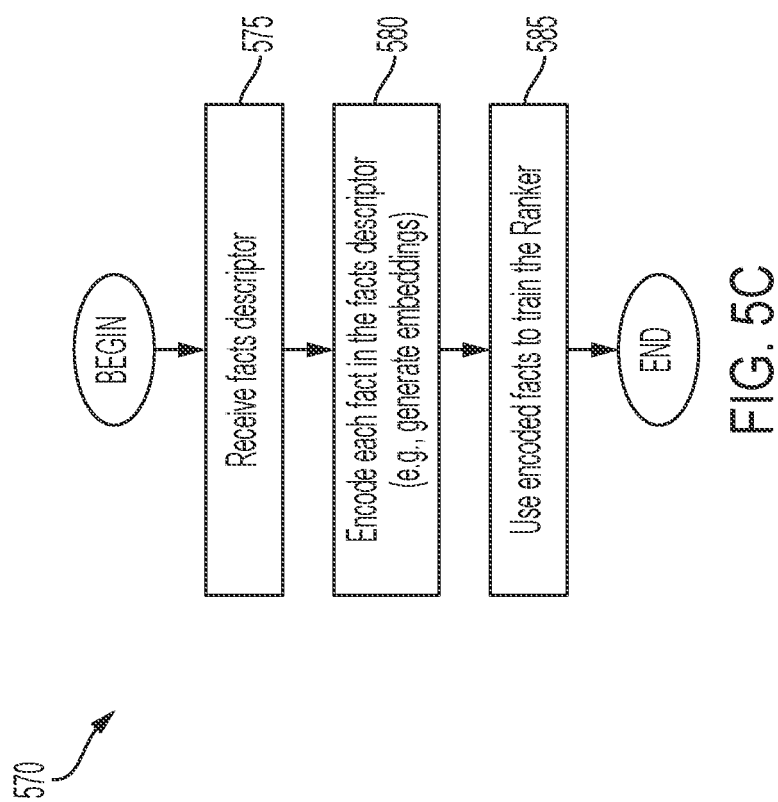
FIG. 5C shows a process for training process performed by the service in some embodiments.

FIG. 5C shows a process for a training process 570 performed in some embodiments by the service 110. The process 570 begins at 575 by receiving a fact descriptor 505.

At 580, the process 570 encodes each fact in the fact descriptor 505. For example, the process 570 may generate an embedding for each fact. The embedding may be, for example, a vector representation of the fact.

At 585, the process 570 uses the encoded facts to train the predictor 105 (e.g., by training a ranker 155 module of the predictor 105). The process 570 then ends.

In some embodiments, the process 570 trains the predictor 105 by building an ANN index from the encoded facts. In some embodiments, the process 570 may populate the index with one entry for every encoded fact. In some embodiments, the process 570 may aggregate encoded facts into groups (e.g., groups defined by algorithms including but not limited to k-means classification) and then populate the index using mean vectors corresponding to each group. In some embodiments, the process 570 may train the predictor 105 by using a neural ranking algorithm (e.g., a neural network).

FIG. 6 shows an example of a training and validation data set 600 used to validate the system 100 in some embodiments. The utterance column 605 represents the input question and the answer column 610 represents the response. The ground truth column 615 is the target classification, and the script column 620 shows the script that was the respective best-scored script classified by the classification model. In total, there were more than 12 facts regarding pay stubs, earnings, company, and personal information. The results of the classification task, shown in the matched column 625, were performed with 100% accuracy, thereby validating more than 170 test utterances.

FIG. 7 shows an example of an output log 700 for an entire execution process in some embodiments, including Entitlement and Disambiguation.

Figure 8:
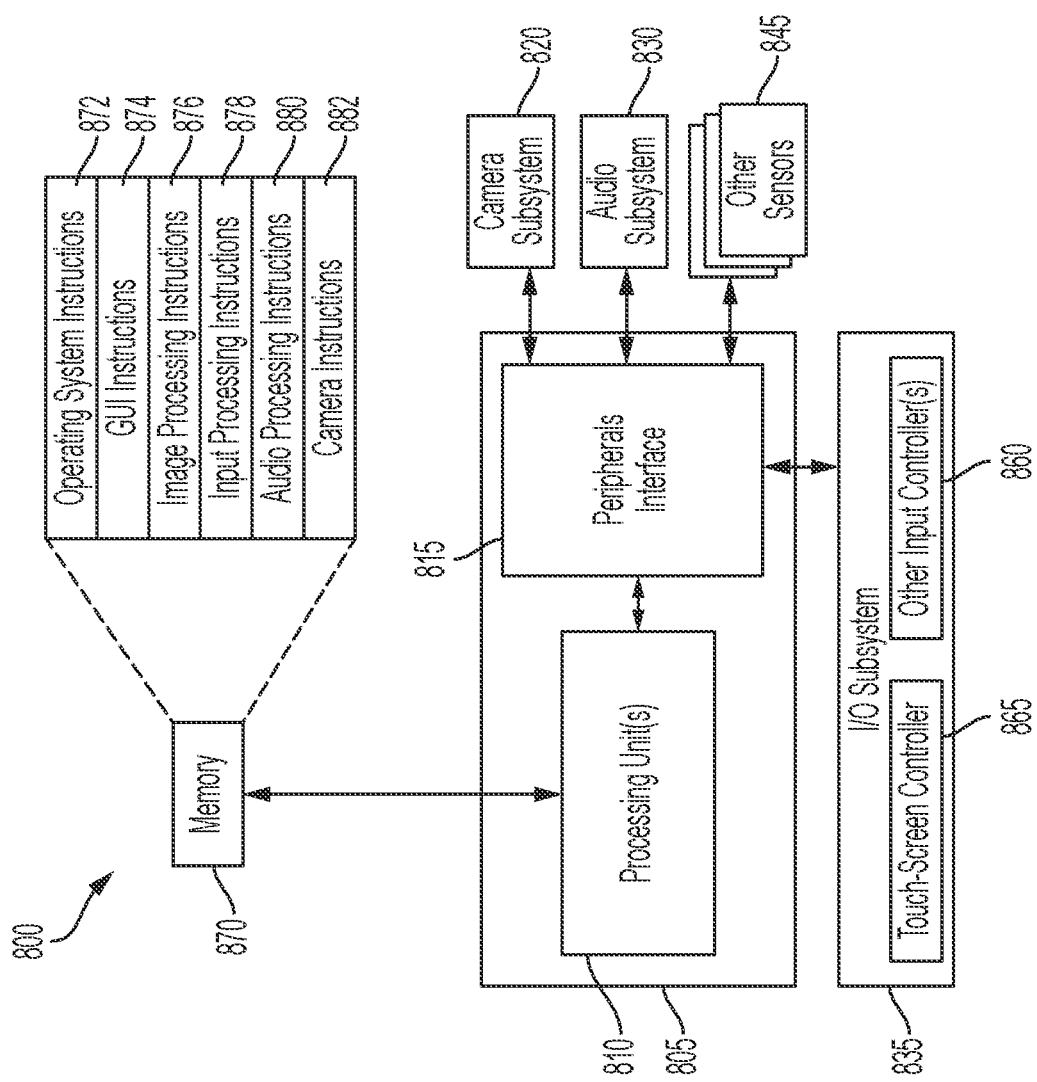
FIG. 8 conceptually illustrates an example of an architecture of an electronic device with which some embodiments of the invention are implemented.

FIG. 8 is an example of an architecture of an electronic device with which some embodiments of the invention are implemented, such as a smartphone, tablet, laptop, etc., or another type of device (e.g., an IOT device, a personal home assistant). As shown, the device 800 includes an integrated circuit 805 with one or more general-purpose processing units 810 and a peripherals interface 815.

The peripherals interface 815 is coupled to various sensors and subsystems, including but not limited to camera subsystem 820, an audio subsystem 830, an I/O subsystem 835, and other sensors 845 (e.g., motion/acceleration sensors), etc. The peripherals interface 815 enables communication between the processing units 810 and various peripherals. For example, an orientation sensor (e.g., a gyroscope) and an acceleration sensor (e.g., an accelerometer) can be coupled to the peripherals interface 815 to facilitate orientation and acceleration functions. The camera subsystem 820 may be coupled to one or more optical sensors (not shown), e.g., charged coupled device (CCD) optical sensors, complementary metal-oxide-semiconductor (CMOS) optical sensors, etc. The camera subsystem 820 and the optical sensors facilitate camera functions, such as image and/or video data capturing.

The audio subsystem 830 may couple with a speaker (not shown) to output audio (e.g., to output voice navigation instructions). Additionally, the audio subsystem 830 may be coupled to a microphone (not shown) to facilitate voice-enabled functions, such as voice recognition, digital recording, etc. The I/O subsystem 835 involves the transfer between input/output peripheral devices, such as a display, a touch screen, etc., and the data bus of the processing units 810 through the peripherals interface 815. The I/O subsystem 835 has various input controllers 860 to facilitate the transfer between input/output peripheral devices and the data bus of the processing units 810. These input controllers 860 couple to various input/control devices, such as one or more buttons, a touch-screen, etc. The input/control devices couple to various dedicated or general controllers, such as a touch-screen controller 865.

In some embodiments, the device includes a wireless communication subsystem (not shown in FIG. 8) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 8, a memory 870 (or set of various physical storages) stores instructions for an operating system 872. The operating system 872 includes instructions for handling basic system services and for performing hardware dependent tasks. The memory 870 also may store various other sets of instructions, including but not limited to (1) graphical user interface instructions 874 to facilitate graphic user interface processing; (2) image processing instructions 876 to facilitate image-related processing and functions; (3) input processing instructions 878 to facilitate input-related (e.g., touch input) processes and functions; (4) audio processing instructions 880 to facilitate audio-related processes and functions; and (5) camera instructions 882 to facilitate camera-related processes and functions. The processing units 810 execute the instructions stored in the memory 870 in some embodiments.

The memory 870 may represent multiple different storages available on the device 800. In some embodiments, the memory 870 includes volatile memory (e.g., high-speed random access memory), non-volatile memory (e.g., flash memory), a combination of volatile and non-volatile memory, and/or any other type of memory.

The instructions described above are merely examples and the memory 870 includes additional and/or other instructions in some embodiments. For instance, the memory for a smartphone may include phone instructions (not shown) to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits. For example, a neural network parameter memory stores the weight values, bias parameters, etc. for implementing one or more machine-trained networks by the integrated circuit 805. Different clusters of cores can implement different machine-trained networks in parallel in some embodiments. In different embodiments, these neural network parameters are stored on-chip (i.e., in memory that is part of the integrated circuit 805) or loaded onto the integrated circuit 805 from the memory 870 via the processing unit(s) 810.

While the components illustrated in FIG. 8 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 8 may be split into two or more separate components.

Figure 9:
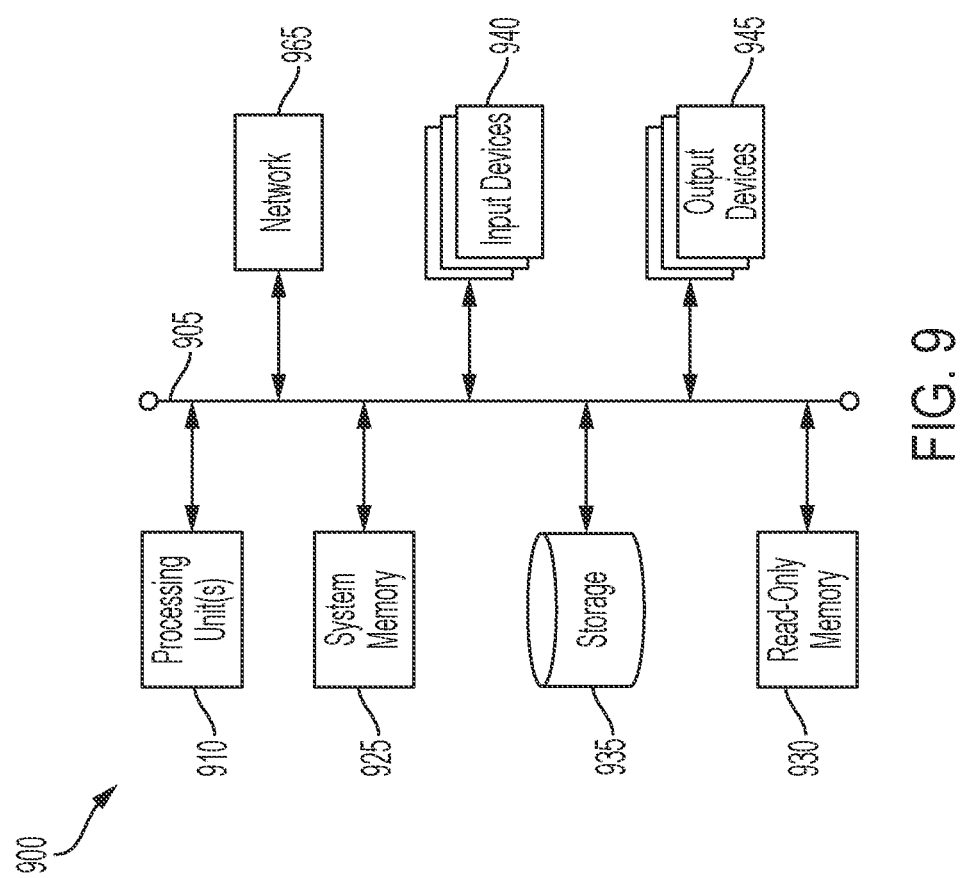
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control and/or compiler systems described above in some embodiments. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 may include one or more of a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input devices 940 and output devices 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

The terms "light" and "optical" are intended to have broad meanings that can include both visible regions of the electromagnetic spectrum as well as other regions, such as, but not limited to, infrared and ultraviolet light and optical imaging, for example, of such light.

As used in this specification, the terms "computer", "server", "processor", and "memory" all refer to electronic or other technological devices. These terms exclude people or groups of people. As used in this specification, the terms "computer readable medium," "computer readable media," and "machine readable medium," etc. are entirely restricted to tangible, physical objects that store information in a form that is readable by a computer. These terms exclude any wireless signals, wired download signals, and any other ephemeral signals.

The term "computer" is intended to have a broad meaning that may be used in computing devices such as, e.g., but not limited to, standalone or client or server devices. The computer may be, e.g., (but not limited to) a personal computer (PC) system running an operating system such as, e.g., (but not limited to) MICROSOFT® WINDOWS® available from MICROSOFT® Corporation of Redmond, Wash., U.S.A. or an Apple computer executing MAC® OS from Apple® of Cupertino, Calif., U.S.A. However, the invention is not limited to these platforms. Instead, the invention may be implemented on any appropriate computer system running any appropriate operating system. In one illustrative embodiment, the present invention may be implemented on a computer system operating as discussed herein. The computer system may include, e.g., but is not limited to, a main memory, random access memory (RAM), and a secondary memory, etc. Main memory, random access memory (RAM), and a secondary memory, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory may include, for example, (but not limited to) a hard disk drive and/or a removable storage drive, representing a floppy diskette drive, a magnetic tape drive, an optical disk drive, a read-only compact disk (CD-ROM), digital versatile discs (DVDs), flash memory (e.g., SD cards, mini-SD cards, micro-SD cards, etc.), read-only and recordable Blu-Ray® discs, etc. The removable storage drive may, e.g., but is not limited to, read from and/or write to a removable storage unit in a well-known manner. The removable storage unit, also called a program storage device or a computer program product, may represent, e.g., but is not limited to, a floppy disk, magnetic tape, optical disk, compact disk, etc. which may be read from and written to the removable storage drive. As will be appreciated, the removable storage unit may include a computer usable storage medium having stored therein computer software and/or data.

In some embodiments, the secondary memory may include other similar devices for allowing computer programs or other instructions to be loaded into the computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to the computer system.

Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The computer may also include an input device may include any mechanism or combination of mechanisms that may permit information to be input into the computer system from, e.g., a user. The input device may include logic configured to receive information for the computer system from, e.g., a user. Examples of the input device may include, e.g., but not limited to, a mouse, pen-based pointing device, or other pointing device such as a digitizer, a touch sensitive display device, and/or a keyboard or other data entry device (none of which are labeled). Other input devices may include, e.g., but not limited to, a biometric input device, a video source, an audio source, a microphone, a web cam, a video camera, and/or another camera. The input device may communicate with a processor either wired or wirelessly.

The computer may also include output devices which may include any mechanism or combination of mechanisms that may output information from a computer system. An output device may include logic configured to output information from the computer system. Embodiments of output device may include, e.g., but not limited to, display, and display interface, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. The computer may include input/output (I/O) devices such as, e.g., (but not limited to) communications interface, cable and communications path, etc. These devices may include, e.g., but are not limited to, a network interface card, and/or modems. The output device may communicate with processor either wired or wirelessly. A communications interface may allow software and data to be transferred between the computer system and external devices.

The term "data processor" is intended to have a broad meaning that includes one or more processors, such as, e.g., but not limited to, that are connected to a communication infrastructure (e.g., but not limited to, a communications bus, cross-over bar, interconnect, or network, etc.). The term data processor may include any type of processor, microprocessor and/or processing logic that may interpret and execute instructions, including application-specific integrated circuits (ASICs) and field-programmable gate arrays (FPGAs). The data processor may comprise a single device (e.g., for example, a single core) and/or a group of devices (e.g., multi-core). The data processor may include logic configured to execute computer-executable instructions configured to implement one or more embodiments. The instructions may reside in main memory or secondary memory. The data processor may also include multiple independent cores, such as a dual-core processor or a multi-core processor. The data processors may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

The term "data storage device" is intended to have a broad meaning that includes removable storage drive, a hard disk installed in hard disk drive, flash memories, removable discs, non-removable discs, etc. In addition, it should be noted that various electromagnetic radiation, such as wireless communication, electrical communication carried over an electrically conductive wire (e.g., but not limited to twisted pair, CAT5, etc.) or an optical medium (e.g., but not limited to, optical fiber) and the like may be encoded to carry computer-executable instructions and/or computer data that embodiments of the invention on e.g., a communication network. These computer program products may provide software to the computer system. It should be noted that a computer-readable medium that comprises computer-executable instructions for execution in a processor may be configured to store various embodiments of the present invention.

The term "network" is intended to include any communication network, including a local area network ("LAN"), a wide area network ("WAN"), an Intranet, or a network of networks, such as the Internet.

The term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

The system may, in some embodiments, include a number of components, each of which may be implemented on a server or on an end-user device. In some cases, a subset of the components may execute on a user device (e.g., a mobile application on a cell phone, a webpage running within a web browser, a local application executing on a personal computer, etc.) and another subset of the components may execute on a server (a physical machine, virtual machine, or container, etc., which may be located at a datacenter, a cloud computing provider, a local area network, etc.).

The components of the system may be implemented in some embodiments as software programs or modules, which are described in more detail below. In other embodiments, some or all of the components may be implemented in hardware, including in one or more signal processing and/or application specific integrated circuits. While the components are shown as separate components, two or more components may be integrated into a single component. Also, while many of the components' functions are described as being performed by one component, the functions may be split among two or more separate components.

In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process.

According to an embodiment of the invention, a system for fact retrieval includes a processor and a non-transitory computer readable medium storing a set of instructions, which when executed by the processor, configure the processor to receive an input from a user, said input comprising a string of text that represents a user intent; perform natural language processing on the input to generate an embedding that corresponds to a semantic representation of the string of text; based on the generated embedding, identify an action from a database, the action being associated with the user intent, the database comprising pre-determined embeddings and actions that are associated with the pre-determined embeddings; execute the identified action, wherein the executed action returns a result associated with the user intent; and provide the result to the user.

Further embodiments of the invention are provided by the subject matter of the following clauses.

A system for fact retrieval includes a processor and a non-transitory computer readable medium storing a set of instructions. When executed by the processor, the instructions configure the processor to receive an input from a user, the input including a string of text that represents a user intent. When executed by the processor, the instructions further configure the processor to perform natural language processing on the input to generate an embedding that corresponds to a semantic representation of the string of text, and based on the generated embedding, identify an action that is associated with the user intent. Multiple actions are associated with multiple pre-determined embeddings. When executed by the processor, the instructions further configure the processor to execute the identified action, such that the executed action returns a result associated with the user intent, and provide the result to the user.

The system of the preceding clause, such that identifying the action includes determining a similarity between the generated embedding and each of multiple pre-determined embeddings, and based on the determined similarity, selecting the action from multiple actions.

The system of any preceding clause, such that selecting the action includes determining that the pre-determined embedding of the selected action is the most similar, of all of the pre-determined embeddings, to the generated embedding.

The system of any preceding clause, such that the action includes an identification of a storage from multiple storages, executing the action includes performing a query to the identified storage, and the result includes a response to the query from the identified storage.

The system of any preceding clause, such that the input further includes a first-person identifier associated with the user, and the query to the identified storage includes the first-person identifier.

The system of any preceding clause, such that the user is a first user, and the string of text includes an ambiguous reference to a second user. When executed by the processor, the instructions further configure the processor to identify multiple user identifiers that at least partially match the ambiguous reference to the second user, and select a user identifier from the multiple user identifiers, such that the query to the identified storage includes the selected user identifier.

The system of any preceding clause, such that the user identifier is selected by providing the identified multiple user identifiers to the first user, and receiving a selection of the user identifier from the first user.

The system of any preceding clause, such that the input further includes a role attribute associated with the first user, such that the user identifier is selected based on a role attribute of the first user.

The system of any preceding clause, such that executing the action includes determining, based on the role attribute of the first user, that the first user is authorized to receive the result from the identified action, such that the user is not authorized to receive results from at least one other action in the plurality of actions.

The system of any preceding clause, such that the string of text includes an ambiguous reference to an identifier. When executed by the processor, the instructions further configure the processor to identify multiple identifiers that at least partially match the ambiguous reference to the identifier, provide the multiple identifiers to the user, and receive a selection of the identifier from the user, such that the query to the identified storage includes the selected identifier.

The system of any preceding clause, such that the identifier is an identifier for one of a place, a document, a person, an access role, a job title, and a date.

REFERENCES

[1] Practice Analysis and Case Study—Conflict of Interest in Employment Relations—https://www.lexology.com/library/detail.aspx?g=007533d0-5d5b-4195-8be3-b068cedf98ec
[2] Facebook AI Similarity Search (Faiss)—https://faiss.ai/
[3] ANN Benchmark—http://ann-benchmarks.com/
[4] 'Knowledge Vault' is a massive database of facts—https://www.technology.org/2014/08/25/knowledge-vault-massive-database-facts/
[5] Open Data—Facts and Knowledge—https://blog.okfn.org/2009/02/09/facts-and-databases/
C. Burges, T. Shaked, E. Renshaw, A. Lazier, M. Deeds, N. Hamilton, and G. Hullender. Learning to rank using gradient descent. In Proc. of ICML '05, pages 89-96, 2005.
C. J. C. Burges, R. Ragno and Q. V. Le. Learning to Rank with Non-Smooth Cost Functions. Advances in Neural Information Processing Systems, 2006.
Proceedings of the 2008 International Conference on Web Search and Data Mining, February 2008, Pages 77-86.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method, comprising:
receiving, by one or more processors, an input from an interface, the input comprising a string of text that represents a user intent;
generating, by the one or more processors, using a natural language processing technique on the input, an embedding that corresponds to a vector representation of the string of text, wherein the embedding encodes a semantic structure of the string of text within a multi-dimensional hyperspace;
executing, by the one or more processors, using a neural network, a vector search in the multi-dimensional hyperspace that determines distances between one or more vector representations of a plurality of pre-determined embeddings and the vector representation of the embedding that corresponds to the string of text, wherein each of the plurality of pre-determined embeddings maps to a respective script configured to retrieve data from at least one of a local data source, cloud service, or remote storage service;
identifying, by the one or more processors, based on the vector search using the embedding that corresponds to the string of text, at least one pre-determined embedding from the plurality of pre-determined embeddings, the at least one pre-determined embedding associated with the user intent;
retrieving, by the one or more processors, at least one script that maps to the at least one pre-determined embedding, the at least one script comprising computer-executable instructions configured to perform operations based at least in part on a semantic structure of the at least one pre-determined embedding;
executing, by the one or more processors, the computer-executable instructions from the at least one script to produce a result associated with the user intent, the result comprising a response to the input from at least one of the local data source, cloud service, or remote storage service; and
providing, by the one or more processors, the response to the input using the interface.

2. The method of claim 1, wherein identifying the at least one pre-determined embedding comprises determining a similarity between the embedding that corresponds to the string of text and each of the plurality of pre-determined embeddings, and based on the determined similarity, selecting the at least one pre-determined embedding from the plurality of pre-determined embeddings.

3. The method of claim 2, wherein selecting the at least one pre-determined embedding comprises determining that the at least one pre-determined embedding is most similar, out of all of the plurality of pre-determined embeddings, to the embedding that corresponds to the string of text.

4. The method of claim 1, wherein the computer-executable instructions cause an identification of a storage from a plurality of storages, executing the computer-executable instructions comprises performing a query to the identified storage, the interface corresponds to a user, and the result is responsive to the query from the identified storage.

5. The method of claim 4, wherein the input further comprises a first-person identifier associated with the user, and the query to the identified storage comprises the first-person identifier.

6. The method of claim 4, wherein the user is a first user, and the string of text comprises an ambiguous reference to a second user, the method further comprising:
identifying, by the one or more processors, a plurality of user identifiers that at least partially match the ambiguous reference to the second user; and
selecting, by the one or more processors, a user identifier from the plurality of user identifiers,
wherein the query to the identified storage comprises the selected user identifier.

7. The method of claim 6, wherein the user identifier is selected by providing the identified plurality of user identifiers to the first user, and receiving a selection of the user identifier from the first user.

8. The method of claim 7, wherein the input further comprises a role attribute associated with the first user, wherein the user identifier is selected based on the role attribute of the first user.

9. The method of claim 8, wherein executing the computer-executable instructions comprises determining, based on the role attribute of the first user, that the first user is authorized to receive the result, wherein the user is not authorized to receive results from at least one other script.

10. The method of claim 4, wherein the string of text comprises an ambiguous reference to an identifier, the method further comprising:
identifying, by the one or more processors, a plurality of identifiers that at least partially match the ambiguous reference to the identifier;
providing, by the one or more processors, the plurality of identifiers to the user; and
receiving, by the one or more processors, a selection of the identifier from the user,
wherein the query to the identified storage comprises the selected identifier.

11. The method of claim 10, wherein the identifier is for one of a place, a document, a person, an access role, a job title, and a date.

12. A non-transitory computer-readable medium storing a set of instructions that, when executed by one or more processors, cause the one or more processors to:
receive an input from an interface, the input comprising a string of text that represents a user intent;
generate, using a natural language processing technique on the input, an embedding that corresponds to a vector representation of the string of text, wherein the embedding encodes a semantic structure of the string of text within a multi-dimensional hyperspace;
executing, by the one or more processors, using a neural network, a vector search in the multi-dimensional hyperspace that determines distances between one or more vector representations of a plurality of pre-determined embeddings and the vector representation of the embedding that corresponds to the string of text, wherein each of the plurality of pre-determined embeddings maps to a respective script configured to retrieve data from at least one of a local data source, cloud service, or remote storage service;
identify, based on the vector search using the embedding that corresponds to the string of text, at least one pre-determined embedding from the plurality of pre-determined embeddings, the at least one pre-determined embedding associated with the user intent;
retrieve at least one script that maps to the at least one pre-determined embedding, the at least one script comprising computer-executable instructions configured to perform operations based at least in part on a semantic structure of the at least one pre-determined embedding;

execute the computer-executable instructions from the at least one script to produce a result associated with the user intent, the result comprising a response to the input from at least one of the local data source, cloud service, or remote storage service; and provide the response to the input using the interface.

13. The non-transitory computer-readable medium of claim 12, wherein identifying the at least one pre-determined embedding comprises determining a similarity between the embedding that corresponds to the string of text and each of the plurality of pre-determined embeddings, and based on the determined similarity, selecting the at least one pre-determined embedding from the plurality of pre-determined embeddings.

14. The non-transitory computer-readable medium of claim 13, wherein selecting the at least one pre-determined embedding comprises determining that the at least one pre-determined embedding is most similar, of the plurality of pre-determined embeddings, to the embedding that corresponds to the string of text.

15. The non-transitory computer-readable medium of claim 12, wherein the computer-executable instructions cause an identification of a storage from a plurality of storages, executing the computer-executable instructions comprises performing a query to the identified storage, the interface corresponds to a user, and the result is responsive to the query from the identified storage.

16. The non-transitory computer-readable medium of claim 15, wherein the input further comprises a first-person identifier associated with the user, and the query to the identified storage comprises the first-person identifier.

17. The non-transitory computer-readable medium of claim 15, wherein the user is a first user, and the string of text comprises an ambiguous reference to a second user, and the instructions further causing the one or more processors to:

identify a plurality of user identifiers that at least partially match the ambiguous reference to the second user; and select a user identifier from the plurality of user identifiers, wherein the query to the identified storage comprises the selected user identifier.

18. The non-transitory computer-readable medium of claim 17, wherein the user identifier is selected by providing the identified plurality of user identifiers to the first user, and receiving a selection of the user identifier from the first user.

19. The non-transitory computer-readable medium of claim 18, wherein the input further comprises a role attribute associated with the first user, wherein the user identifier is selected based on the role attribute of the first user.

20. The non-transitory computer-readable medium of claim 19, wherein executing the computer-executable instructions comprises determining, based on the role attribute of the first user, that the first user is authorized to receive the result, wherein the user is not authorized to receive results from at least one other script.

21. The non-transitory computer-readable medium of claim 15, wherein the string of text comprises an ambiguous reference to an identifier, and the instructions further causing the one or more processors to:

identify a plurality of identifiers that at least partially match the ambiguous reference to the identifier;

provide the plurality of identifiers to the user; and receive a selection of the identifier from the user, wherein the query to the identified storage comprises the selected identifier.

22. The non-transitory computer-readable medium of claim 21, wherein the identifier is for one of a place, a document, a person, an access role, a job title, and a date.

* * * * *